(No Model.)

J. TENNANT & J. HATTERSLEY.
METALLIC GASKET FOR STEAM JOINTS.

No. 260,506. Patented July 4, 1882.

Witnesses:
O. F. Malmborg.
Thomas E. Crossman

Inventors:
Tennant & Hattersley
by James A. Whitney,
Attorney.

United States Patent Office.

JOHN TENNANT AND JOHN HATTERSLEY, OF BROOKLYN, N. Y.

METALLIC GASKET FOR STEAM-JOINTS.

SPECIFICATION forming part of Letters Patent No. 260,506, dated July 4, 1882.

Application filed May 18, 1882. (No model.)

*To all whom it may concern:*

Be it known that we, JOHN TENNANT and JOHN HATTERSLEY, both of Brooklyn, in the county of Kings and State of New York, have invented an Improvement in Steam-Joints, of which the following is a spcification.

This invention comprises the combination of a metallic gasket of peculiar composition with the coincident parts or surfaces of a steam-joint—such, for example, as a steam-joint at the end of an engine-cylinder, or that between the walls of a valve-chest and the bonnet of the latter, or between the ends of a butt-jointed pipe.

Figure 1:
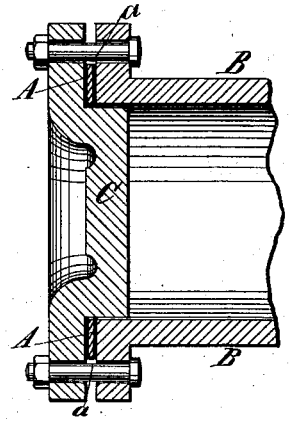
Figure 2:
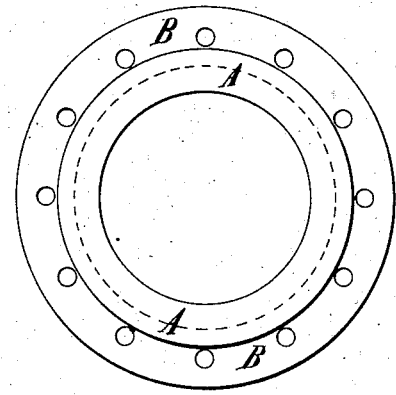
Figure 3:
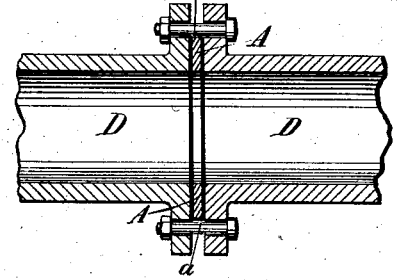

Figure 1 is a sectional view, representing our said invention as embodied in the construction of a steam-engine cylinder. Fig. 2 is an end view of the cylinder with the end removed and with the packing in place. Fig. 3 is a sectional view, illustrating the application of the invention in the form of a joint between the flanged ends of two coincident pipes.

In order to provide the metallic gasket, which forms one element in our novel combination of parts, we provide an alloy composed of three and one-half parts of copper, ten parts of antimony, three parts of spelter, and one hundred parts of tin. In the manufacture or production of this alloy we take, say, twenty-five pounds of metallic tin and melt the same and bring it to a temperature sufficient to melt the copper, the copper being then added to the said portion of the tin and melted or dissolved therein. We then melt the antimony, and in the like manner incorporate it with the two metals first named. This done, we add the spelter, the proportions being substantially as follows—that is to say, three and one-half pounds of copper, ten of antimony, three of spelter, and twenty-five of tin. When these materials are thus melted together and combined we add the remainder of the tin,—say, seventy-five pounds—making a total of metallic ingredients of about one hundred and sixteen and one-half pounds, the second or additional quantity of tin last mentioned being incorporated with the alloy first formed. The mass is allowed to cool and then rolled into sheets of suitable thickness. These sheets may be cut into an annular form, corresponding to that of the joint to be made. The annular gaskets thus produced are placed flatwise between the parts to be joined—as, for example, at A in Fig. 1—between the cylinder B and the cylinder-head C. The gasket should be so proportioned as to come within the line of bolts *a*, by which the head is attached to the cylinder, as shown at *a*. By tightening the bolts the head C and cylinder B are forced toward each other, and the gasket A is pressed between them, forming a steam-tight joint.

The peculiar advantage of our invention is that the gasket, composed of the metals named in substantially the proportions specified, while possessing all the advantages of other alloys hitherto used for similar purposes, is found to be free from the defect of "drawing out," as it is termed, under steam-pressure, which we have found in practice to be a very serious drawback to the general use of metallic packing in lieu of asbestus and other packings. Furthermore, the gasket composed of the said alloy, while having consistency and character, which prevents the drawing out under steam-pressure, as aforesaid, is yet sufficiently soft and yielding to enable it to be compressed and fitted steam-tight between comparatively-irregular surfaces. This property becomes especially valuable in view of the fact that it enables the gasket to be used in making the packings of old or used steam-cylinders and their heads—such, for example, as have had an india-rubber packing, which corrodes the surfaces with which it has been in contact, rendering them uneven and unequal, and consequently liable to leak.

By thus combining with the parts to be joined an interposed packing having the composition and peculiar characteristics of that herein described we provide a tighter joint for steam-cylinders and their heads, as represented in Fig. 1, and for butt-jointed pipes D, as represented in Fig. 3, and also for analogous purposes—as, for instance, the walls and bonnets of steam-chests and the like.

What we claim as our invention is—

The combination, with the coincident parts B C of a steam-cylinder or steam-joint and the bolts *a* thereof, of the interposed metallic gasket composed of copper, antimony, spelter, and tin, in substantially the proportions herein described, all substantially as and for the purpose herein set forth.

JOHN TENNANT.
JOHN HATTERSLEY.

Witnesses:
DANFORTH BECKER,
THOMAS E. CROSSMAN.